US011061947B2

(12) United States Patent
Boxwell et al.

(10) Patent No.: US 11,061,947 B2
(45) Date of Patent: Jul. 13, 2021

(54) EFFICIENT CORPUS SEARCH AND ANNOTATION MANAGEMENT FOR A QUESTION ANSWERING SYSTEM

(71) Applicant: INTERNATIONAL BUSINESS MACHINES CORPORATION, Armonk, NY (US)

(72) Inventors: Stephen A. Boxwell, Franklin, OH (US); Keith G. Frost, Delaware, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 16/509,937

(22) Filed: Jul. 12, 2019

(65) Prior Publication Data
US 2021/0011934 A1   Jan. 14, 2021

(51) Int. Cl.
*G06F 16/33* (2019.01)
*G06F 16/332* (2019.01)

(52) U.S. Cl.
CPC ...... *G06F 16/3344* (2019.01); *G06F 16/3329* (2019.01)

(58) Field of Classification Search
CPC ........... G06F 16/24578; G06F 16/3329; G06F 40/30; G06F 16/24522; G06F 16/3344; G06F 40/40; G06F 16/243; G06F 16/367; G06F 40/10; G06F 40/205
USPC .......................... 707/737, 730; 706/112, 46
See application file for complete search history.

(56) References Cited

U.S. PATENT DOCUMENTS

| | | |
|---|---|---|
| 6,029,165 A | 2/2000 | Gable |
| 6,542,889 B1 | 4/2003 | Aggarwal et al. |
| 6,647,383 B1 | 11/2003 | August et al. |
| 8,332,394 B2 | 12/2012 | Fan et al. |
| 8,712,758 B2 | 4/2014 | Crouch et al. |
| 9,031,832 B2 | 5/2015 | Boguraev et al. |

(Continued)

OTHER PUBLICATIONS

Stubbs et al, "Natural Language Annotation for Machine Learning", O'Reilly, 2013, accessed online at <https://doc.lagout.org/science/Artificial%20Intelligence/Machine%20learning/Natural%20Language%20Annotation%20for%20Machine%20Learning_%20A%20Guide%20to%20Corpus-...%20%5BPustejovsky%20%26%20Stubbs%202012-11-04%5D.pdf>, 343 pages.

(Continued)

*Primary Examiner* — Hung T Vy
(74) *Attorney, Agent, or Firm* — Edward J. Wixted, III

(57) ABSTRACT

A computer converts a question received in a natural language format into a string of text elements. The computer searches a corpus comprising unstructured passages with the string of the text elements as search terms to identify a selection of unstructured passages from the corpus relevant to the text elements. The computer annotates the selection of relevant unstructured passages with one or more annotations according to at least one natural language annotation type to generate an annotated selection knowledge base. The computer modifies the string of text elements by annotating at least one of the text elements according to the at least one natural language annotation type. The computer searches the annotated selection knowledge base using the modified string of text elements to generate a selection of ranked passages. The computer identifies an answer to the question based on the selection of ranked passages.

20 Claims, 8 Drawing Sheets

(56) References Cited

U.S. PATENT DOCUMENTS

| | | |
|---|---|---|
| 9,569,733 B2 | 2/2017 | Nassar et al. |
| 2011/0078145 A1* | 3/2011 | Chung .................. G06F 16/313 |
| | | 707/737 |
| 2015/0039536 A1* | 2/2015 | Cook ................ G06F 16/24575 |
| | | 706/11 |
| 2016/0180217 A1* | 6/2016 | Boston ............. G06F 16/24578 |
| | | 706/46 |
| 2016/0180438 A1* | 6/2016 | Boston ............... G06Q 30/0282 |
| | | 705/26.7 |
| 2016/0267392 A1* | 9/2016 | Prager ................... G06N 7/005 |

OTHER PUBLICATIONS

Chu-Carroll, Jennifer & Brown, Eric & Lally, A & Murdock, J William. (2012). Identifying implicit relationships. IBM Journal of Research and Development. 56. 12:1-12:10. 10.1147/JRD.2012. 2188154, brenocon.com/watson_special.../12%20identifying% 20implicit%20relationships.pdf, published in IBM J. Res. & Dev., vol. 56, No. 3 of 4, Paper 12, May/Jul. 2012, 10 pages.

* cited by examiner

EFFICIENT CORPUS SEARCH AND ANNOTATION MANAGEMENT FOR A QUESTION ANSWERING SYSTEM

BACKGROUND

1. Technical Field

One or more embodiments of the invention relate generally to data processing and particularly to efficient corpus search and annotation management for a question answering system.

2. Description of the Related Art

Natural language processing (NLP) refers to a technique that supports applications that facilitate human interaction in natural language with machines. For example, one branch of NLP pertains to answering questions about a subject matter based on information available about the subject matter from a large corpus, or collection of data, such as text, stored electronically.

BRIEF SUMMARY

In one embodiment, a method is directed to converting, by a computing device, a question received in a natural language format into a string of a plurality of text elements. The method is directed to searching, by the computing device, a corpus comprising a plurality of unstructured passages with the string of the plurality of text elements as search terms to identify a selection of unstructured passages from the corpus relevant to the plurality of text elements. The method is directed to annotating, by the computing device, the selection of relevant unstructured passages with one or more annotations according to at least one natural language annotation type to generate an annotated selection knowledge base. The method is directed to modifying, by the computing device, the string of the plurality of text elements by annotating at least one text element within the plurality of text elements according to the at least one natural language annotation type. The method is directed to searching, by the computing device, the annotated selection knowledge base using the modified string of the plurality of text elements to generate a selection of ranked passages. The method is directed to identifying, by the computing device, an answer to the question based on the selection of ranked passages.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to convert a question received in a natural language format into a string of a plurality of text elements. The stored program instructions comprise program instructions to search a corpus comprising a plurality of unstructured passages with the string of the plurality of text elements as search terms to identify a selection of unstructured passages from the corpus relevant to the plurality of text elements. The stored program instructions comprise program instructions to annotate the selection of relevant unstructured passages with one or more annotations according to at least one natural language annotation type to generate an annotated selection knowledge base. The stored program instructions comprise program instructions to modify the string of the plurality of text elements by annotating at least one text element within the plurality of text elements according to the at least one natural language annotation type. The stored program instructions comprise program instructions to search the annotated selection knowledge base using the modified string of the plurality of text elements to generate a selection of ranked passages. The stored program instructions comprise program instructions to identify an answer to the question based on the selection of ranked passages.

In another embodiment, a computer program product comprises a computer readable storage medium having program instructions embodied therewith, wherein the computer readable storage medium is not a transitory signal per se. The program instructions are executable by a computer to cause the computer to convert, by a computer, a question received in a natural language format into a string of a plurality of text elements. The program instructions are executable by a computer to cause the computer to search, by the computer, a corpus comprising a plurality of unstructured passages with the string of the plurality of text elements as search terms to identify a selection of unstructured passages from the corpus relevant to the plurality of text elements. The program instructions are executable by a computer to cause the computer to annotate, by the computer, the selection of relevant unstructured passages with one or more annotations according to at least one natural language annotation type to generate an annotated selection knowledge base. The program instructions are executable by a computer to cause the computer to modify, by the computer, the string of the plurality of text elements by annotating at least one text element within the plurality of text elements according to the at least one natural language annotation type. The program instructions are executable by a computer to cause the computer to search, by the computer, the annotated selection knowledge base using the modified string of the plurality of text elements to generate a selection of ranked passages. The program instructions are executable by a computer to cause the computer to identify, by the computer, an answer to the question based on the selection of ranked passages.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
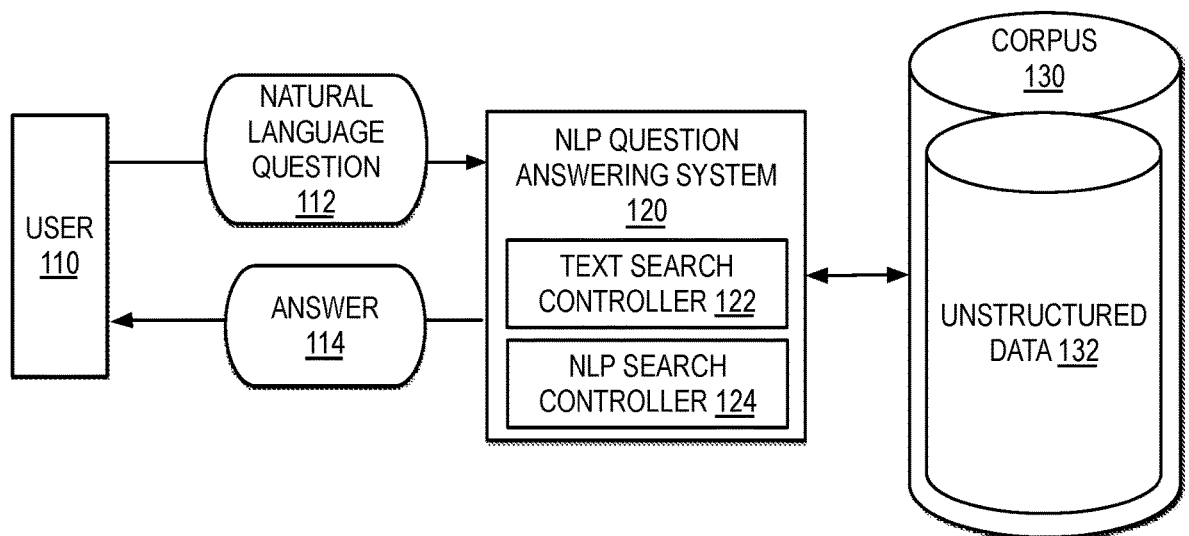
FIG. 1 illustrates one example of a block diagram of a natural language processing (NLP) answering system for generating answers to submitted natural language questions.

FIG. 1 illustrates one example of a block diagram of a natural language processing (NLP) answering system for generating answers to submitted natural language questions.

In one example, FIG. 1 illustrates a user 110 submitting a natural language question 112 to an NLP question answering system 120. In one example, NLP question answering system 120 supports answering natural language question 112 through NLP techniques that facilitate the exchange of information between users, such as a human or an automated user, submitting questions in a natural language. In the example illustrated, NLP question answering system 120 supports NLP based answering of questions about a subject matter based on information available in a corpus 130, including unstructured data 132. In the example, NLP question answering system 120 determines one or more passages relevant to natural language question 112 from corpus 130. NLP question answering system 120 selects one or more particular responses from the one or more passages relevant to natural language question 112, generates an answer 114 from the one or more particular responses, and returns answer 114 to user 110.

In one example, natural language question 112 includes a string of text, which forms the basis of the elements of a query. In one example, natural language question 112 includes a string of text in sentence structure associated with a question. In other example, natural language question 112 includes a string of text with elements that effectively present a question. In one example, the string of text in natural language question 112 represents a string of text elements in a natural human language format that is unstructured, without pre-defined data models or schema.

In one example, corpus 130 represents data, or a collection of data, used in linguistics and language progressing. In general, corpus 130 includes large volumes of data stored electronically. In the example, corpus 130 at least includes unstructured data 132. In one example, unstructured data 132 represents data that are not structured through pre-defined data models or schema or that are not annotated with metadata using a same specification to assist in identifying patterns and inferences. In one example, unstructured data 132 represents a collection of machine-readable texts that are representative of a variety of language, such as, but not limited to, newspaper articles, blogs, books, text of spoken speech, text from social media entries, and legal documents. In additional or alternate embodiments, corpus 130 may include both unstructured data 132 and additional structured data, where structured data represent data stored within a structure, such as a relational database, identified by searchable, predefined data models or schema, or other structures including annotations identified using a same specification.

In one example, one of the functions of NLP question answering system 120 is applying NLP classifier models to annotate unstructured data for application in NLP applications. Annotating unstructured data into structured data by applying NLP classifier models to a corpus of data takes computational time and resources. As the amount of unstructured data 132 in corpus 130 increases, the accuracy metrics for correctly selecting answers to questions generally increases as well, however, the time required to annotate unstructured data into structured data also exponentially increases with each passage added to unstructured data 132.

According to an advantage of the present invention, in response to NLP question answering system 120 receiving natural language question 112, NLP question answering system 120 selects to first trigger a text search controller 122, which searches unstructured data 132 of corpus 130 based on the string of text in natural language question 112, without first annotating natural language question 112 or annotating unstructured data 132. For example, text search controller 122 applies each element of the string of text in natural language question 112 as a text element for searching corpus 130.

In response to text search controller 122 identifying one or more selected passages in unstructured data 132 that include one or more of the text elements in the searched string of data, text search controller 122 selects a portion of the one or more selected passages as the first selection of potentially relevant passages. In the example, by text search controller 122 performing a search on unstructured data 132, text search controller 122 efficiently identifies passages within unstructured data 132 that are potentially relevant by a match of text to text, which requires a relatively small amount of computational resources when compared with the more significant computing resources required to annotate all of unstructured data 132.

In response to text search controller 122 identifying the first selection of potentially relevant passages, NLP question answering system 120 triggers a NLP search controller 124 to dynamically annotate the first selection of potentially relevant passages only, from among corpus 130. NLP search controller 124 also refines the search query formed from natural language question 112 by annotating one or more elements of natural language question 112. Next, NLP search controller 124 searches the annotated selection of passages using the modified search query to identify a second selection of relevant passages and ranks the second selection of relevant passages based on percentage relevance. NLP search controller 124 selects whether to generate an answer to the question based on the ranked selection of relevant passages or whether to perform additional tiers of annotating the ranked selection of relevant passages and searching the ranked selection of relevant passages with a further modified search query, prior to generating an answer to the question based on the resulting ranked selection of relevant passages.

According to an advantage of the present invention, since the size of corpus 130 may require using disk space to store corpus 130, by initially searching corpus 130 through a text search to narrow corpus 130 to a smaller selection of potentially relevant passages, before annotating the passages, question answering system 120 may store the smaller selection of annotated potentially relevant passages in memory, rather than on disk, for faster, more efficient access for searching and minimized memory requirements. In addition, according to an advantage of the present invention, while text search controller 122 is capable of initially annotate all of corpus 130, by triggering text search controller 122 to initially narrow corpus 130 to a smaller selection of potentially relevant passages, on demand, and then NLP search controller 124 only annotating the narrowed, smaller selection of potentially relevant passages, as a client selects to change the passages included in corpus 130, NLP search controller 124 does not need to iteratively perform the process of annotating all of corpus 130 each time there is a change to corpus 130 and NLP search controller 124 and also does not spend time annotating passages of corpus 130 that may be replaced or modified, or that may not be relevant to any natural language questions presented.

While FIG. 1 is described with reference to NLP question answering system 120 facilitating question answering, in additional or alternate embodiments, NLP question answering system 120 may support additional or alternate types of NLP functions that include receiving an input query from a user, searching a corpus, evaluating a response based on the NLP search of the corpus, and returning a response to the user. In addition, in additional or alternate embodiments, NLP question answering system 120 may concurrently support multiple users and concurrently access unstructured data from multiple sources as corpus 130.

Figure 2:
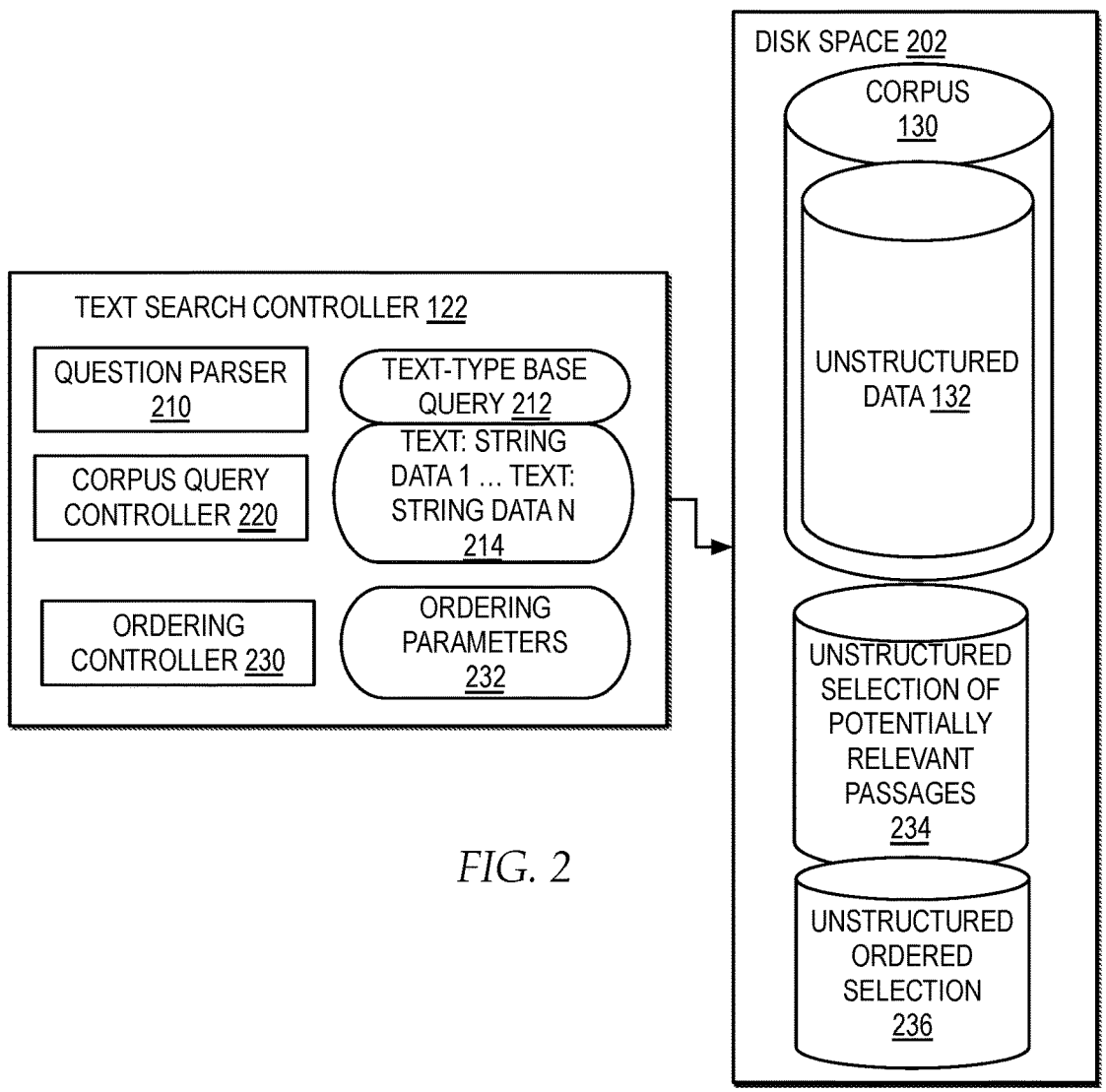
FIG. 2 illustrates one example of a block diagram of components of a text search controller of an NLP answering system.

FIG. 2 illustrates one example of a block diagram of components of a text search controller of an NLP answering system.

In one example, text search controller 122 implements a question parser 210. In one example, question parser 210 evaluates natural language question 112 to identify one or more text elements within a string of data in natural language question 112 and generates a text-type base query 212. For example, question parser 210 may evaluate a string of data of natural language question 112 and parse selections of one or more data elements in the string into multiple elements identified as a type "text", as illustrated by "text: string data 1 . . . text: string data N" 214. In the example, "string data 1" and "string data N" each represent one or more data elements from the string of data in natural language question 112, each identified by the type "text".

In one example, text search controller 122 implements a corpus query controller 220. In one example, corpus query controller 220 applies text-type base query 212 to corpus 130. In one example, by applying text-type base query 212 to unstructured data 132 of corpus 130, text search controller 122 searches corpus 130 for one or more passages that include the text in "string data 1" through "string data N" through efficient text matching comparisons. In the example, text search controller 122 stores the results of a selection of passages from unstructured data 132 with text that matches one or more of the strings of data in text-type base query 212 as unstructured selection of potentially relevant passages 234. According to an advantage of the invention, by first sorting through unstructured data 132 and selecting unstructured selection of potentially relevant passages 234 based on a text types, text search controller 122 filters unstructured data 132 in corpus 130 to a selection of potentially relevant passages to a natural language question, without first requiring a time-consuming process of annotating all of corpus 130 for a semantic-type query. In addition, according to an advantage of the invention, by determining unstructured selection of potentially relevant passages 234, without first requiring a time-consuming process of annotating all of corpus 130 for a semantic-type query, as the passages in corpus 130 change over time, text search controller 122 can provide a question answering service without needing to perform a time-consuming process of annotating all of corpus 130 each time there are changes to passages in corpus 130.

In one example, text search controller 122 also implements an ordering controller 230 that applies ordering parameters 232 to unstructured selection of potentially relevant passages 234 to designate a selection of passages from unstructured selection of potentially relevant passages 234 into unstructured order selection 236. In one example, ordering parameters 232 specify one or more types of criteria for ordering and selecting passages including, but not limited to, a selection preference for passages that include multiple instances of a same string data element, a selection preference for passages that include instances of multiple sting data elements from text-type base query 212, and a selection preference for a particular percentage of the passages with a highest matching percentage. In one example, by further filtering unstructured selection of potentially relevant passages 234 according to ordering parameters 232 into a subset of passages in unstructured order selection 236, text search controller 122 efficiently identifies the subset of passages from unstructured data 132 that are most relevant to a particular natural language question, on demand, prior to performing a more time-consuming annotation process.

In one embodiment, corpus 130 is a large collection of data stored in a disk space 202 that is large enough to accommodate corpus 130. In one example, corpus 130 is significantly larger than the storage space available in local memory. In one example, disk space 202 represents a storage capacity adequate for efficiently managing storage of corpus 130. In one example, disk space 202 represents a logical disk space comprising multiple physical disk storage spaces. In one example, one or more passages in corpus 130 are modified, deleted, or added, however, corpus 130 may remain accessible to NLP question answering system 120 from disk space 202.

In one embodiment, unstructured selection of potentially relevant passages 234 and unstructured ordered selection 236 are also stored on disk space 202 during a query process for natural language question 112, however, may be discarded from disk space 202 in response to NLP question answering system 120 determining answer 114 for natural language question 112. In another embodiment, one or more of unstructured selection of potentially relevant passages 234 and unstructured ordered selection 236 may be temporarily stored in local memory during a query process for natural language question 112. For example, ordering parameters 232 may specify a filtering preference that limits the subset of passages in unstructured ordered selection 236 to meet a memory capacity constraint.

Figure 3:
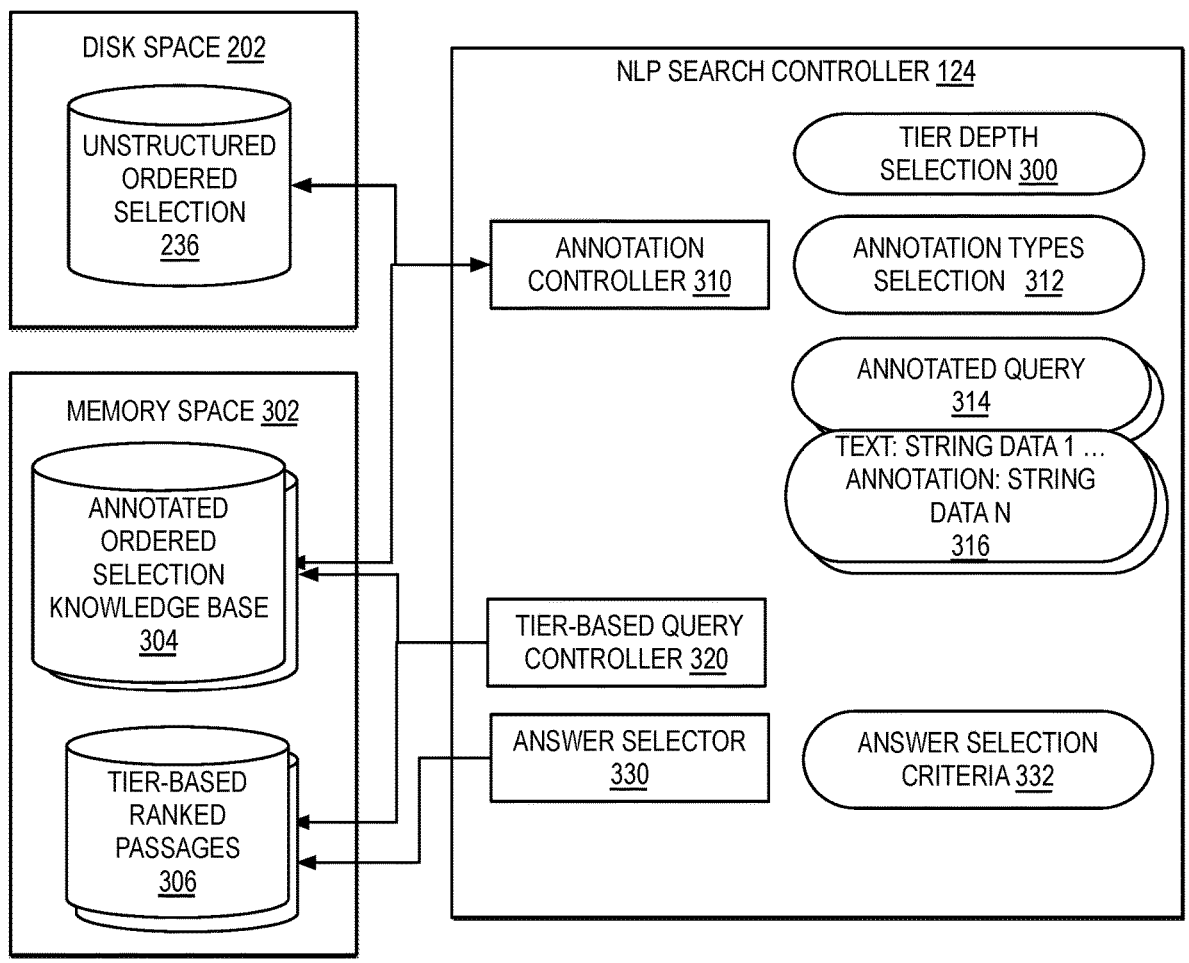
FIG. 3 illustrates one example of a block diagram of components of an NLP search controller of an NLP answering system.

FIG. 3 illustrates one example of a block diagram of components of an NLP search controller of an NLP answering system.

In the embodiment, NLP search controller 124 implements a tier-based NLP evaluation of the responses in unstructured ordered selection 236 to generate an answer to natural language question 112. In the example, a number of tiers specified in a tier depth selection 300 selects the number of tiers of NLP evaluation performed by NLP search controller 124 for a particular natural language question. In the embodiment illustrated, tier depth selection 300 is set to at least one, and may be set to more than one.

In one example, NLP search controller 124 implements an annotation controller 310 for managing each tier of annotation. For a first tier specified by tier depth selection 300, annotation controller 310 accesses unstructured ordered selection 236 and generates annotated ordered selection knowledge base 304. In the example, annotation controller 310 evaluates and classifies unstructured ordered selection 236 according to one or more types of annotations, as specified in annotation types selection 312, to generate annotated ordered selection knowledge base 304, which reflects the passages in unstructured ordered selection 236, annotated according to the selected annotation types. For example, annotation types selection 312 includes one or more types of annotations such as, but not limited to, parts of speech (POS), phrase structure, and dependency structure. Selections of annotation types may also be identified by annotation strategies, such as, but not limited to, syntactic parsing, tokenization, and named entity recognition.

In the example, each annotation type in annotation types selection 312 may also be specified by tier depth. For example, annotation types selection 312 may include a first annotation type of named entity recognition, for application by annotation controller 310 for a first tier of annotation, and a second annotation type of syntactic parsing, for application by annotation controller 310 for a second tier of annotation.

In one example, the annotations generated by annotation controller 310 in annotated ordered selection knowledge base 304 represent metadata tags added to the text in passages of unstructured ordered selection 236. In one example, annotation controller 310 applies one or more trained models, such as classifier models, for each annotation type selected to evaluate the text of unstructured ordered selection 236 and selectively annotate the text as annotated ordered selection knowledge base 304. In particular, in one example, machine learning plays a central role in supporting artificial intelligence-based applications provide by NLP search controller 124, carrying out tasks that require one or more types of text classification analysis. In one example, machine learning may represent one or more types of artificial intelligence that are based on training a machine with data and algorithms that learn from and make predictions on data. One of the primary outcomes of the process of creating and training a machine learning environment is a data object, referred to as a model, built from sample inputs. In one example, annotation controller 310 implements multiple models, each representing a data object of a machine learning environment, for annotating unstructured ordered selection 236 to generate annotated ordered selection knowledge base 304.

In the example, in addition to annotation controller 310 generating annotated ordered selection knowledge base 304 for each tier of one or more annotation types in annotation types selection 312, annotation controller 310 also modifies text-type base query 212 by tier, by parsing and annotating one or more text elements of text-type based query 212, to generate annotated query 314 for each tier depth. In one example, annotated query 314 replaces or modifies one or more text-type labels associated with the data elements in the string of data in the query with an annotation-type label for each tier depth. For example, annotated query 314 is illustrated at reference numeral 316 for a first tier with a label for "string data 1" remaining as "text", for a text-type label, but with the label for "string data N" replaced with "annotation", for an annotation-type label, such as an entity type.

In the example, NLP search controller 124 implements a tier-based query controller 320 that manages each query for each tier depth specified in tier depth selection 300. For example, tier-based query controller 320 applies a first tier NLP search by searching annotated ordered selection knowledge base 304 based on annotated query 314 and orders the passages among annotated ordered selection knowledge base 304 that rank the highest with both annotation-type data matching and text-type data matching into tier-based ranked passages 306. In one example, tier based-query controller 320 applies classifier prediction results as the ranking criteria for ordering the passages according to probability of relevance.

In the example, if tier depth selection 300 is set to more than one tier depth, then for each addition tier depth setting, annotation controller 310 evaluates and annotates annotated ordered selection knowledge base 304 with a next annotation type set for the next-level tier depth in annotation types selection 312 and modifies annotated query 314 with an additional annotation label for the next annotation type set for the next-level tier depth in annotation types selection 312. In addition, tier-based query controller 320 searches annotated ordered selection knowledge base 304 with annotated query 314 and identifies tier-based ranked passages 306 for the next-level tier depth.

In the example, in response to tier-based query controller 320 completing queries for each tier level specified in tier depth selection 300, answer selector 330 evaluates tier-based ranked passages 306 to determine a top selection of passages and formats an answer based on answer selection criteria 332. In one example, answer selection criteria 332 designates one or more rules for applying the top selection of passages from tier-based ranked passages 306 to generate answer 114.

In the example, according to an advantage of the invention, while unstructured ordered selection 236 may include a number of entries that requires storage space larger than the storage space available in a memory space 302, annotated ordered selection knowledge base 304 and tier-based ranked based 306 are limited in size to a number of entries that may be stored in memory space 302, to facilitate faster, more efficient query evaluation and answer selection. In one example, memory space 302 represents a smaller, faster memory space proximate to one or more processors and facilitates faster data processing speeds, while disk space 202 represents a larger storage space not as proximate to the one or more processors as memory space 302.

In one example, while one or more tiers of annotated order selection 304 and one or more tiers of tier-based ranked passages 306 may be maintained in memory space 302 or stored in disk space 202 for use in evaluating subsequent natural language questions, according to an advantage of the invention, because the amount of data annotated and queried is minimal in comparison to the amount of data in corpus 130, annotated order selection 304 and tier-based ranked passages 306 may be discarded from memory space 302 after a search is complete or after a period of time, to avoid maintaining stale data and facilitate efficient management of queries as corpus 130 changes and for applying different annotation type selections to separate searches.

Figure 4:
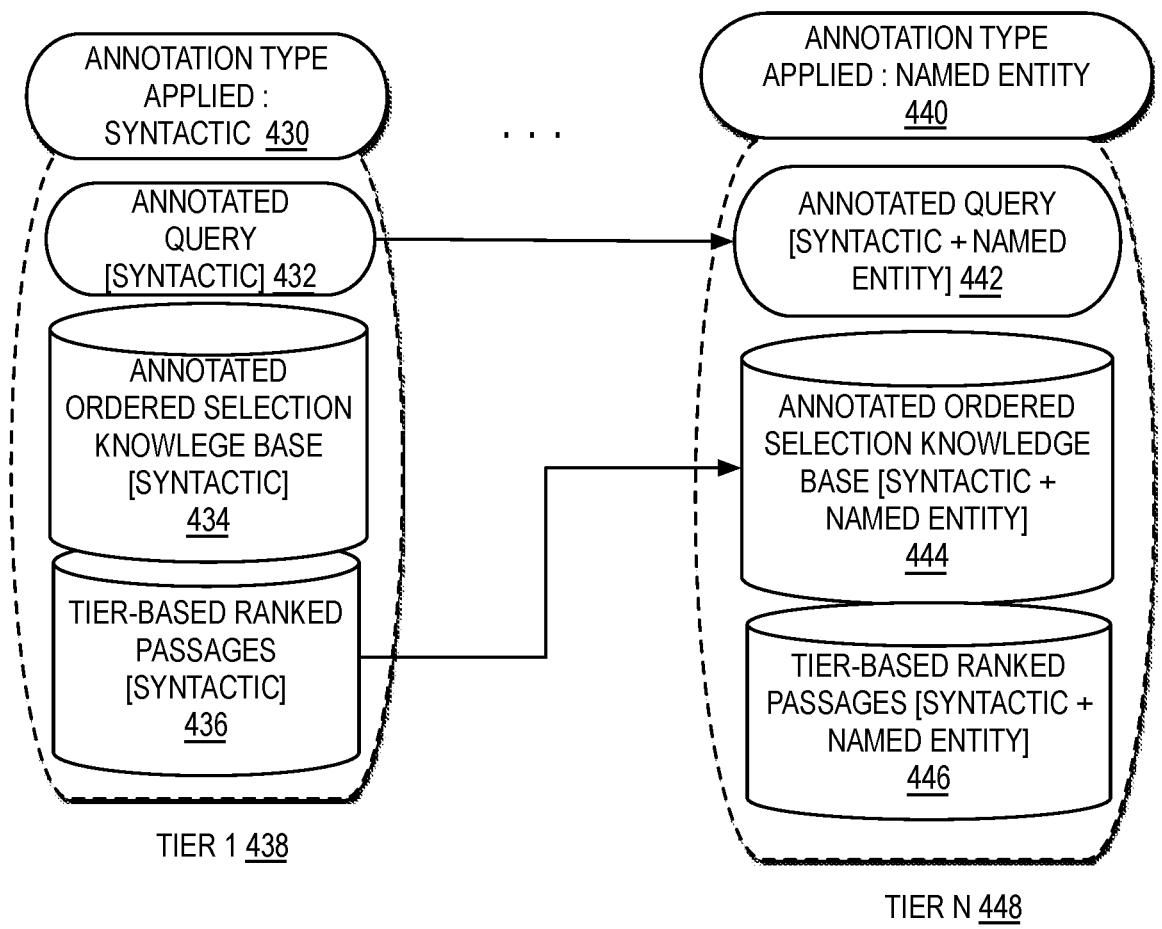
FIG. 4 illustrates one example of a block diagram of multiple tier selections by an NLP search controller of an NLP answering system.

FIG. 4 illustrates one example of a block diagram of multiple tier selections by an NLP search controller of an NLP answering system.

In one example, NLP search controller 124 manages an N-tier depth search. In the example, for a first tier, illustrated at reference numeral 438 as "tier 1", annotation controller 310 applies a first annotation type of "syntactic" to text-type based query 212 to generate annotated query 432 with "syntactic" annotations and to unstructured ordered selection 236 to generate annotated ordered selection knowledge base 434 with "syntactic" annotations of the records in unstructured ordered selection 236. In the example, tier-based query controller 320 applies annotated query 432 to annotated ordered selection knowledge base 434 to generate tier-based ranked passages 436, which is a subset of annotated ordered selection knowledge base 434 with a highest probability of matching annotated query 432.

In one example, NLP search controller 124 manages one or more additional tiers, illustrated at reference numeral 448 as "tier N". For "tier N", annotation controller 310 applies a next annotation type of "named entity" to annotated query 432 to generate annotated query 442 with "syntactic" and "named entity" annotations and to tier-based ranked passages 436 to generate annotated ordered selection knowledge base 444 with "syntactic" and "named entity" annotations of the records in tier-based ranked passages 436. In the example, tier-based query controller 320 applies annotated query 442 to annotated ordered selection knowledge base 444 to generate tier-based ranked passages 446, which is a subset of annotated ordered selection knowledge base 444 with a highest probability of matching annotated query 442.

In the example, by applying annotation types in tiers, NLP search controller 124 may select to apply a first annotation type in a first tier that requires fewer processing resources to narrow the number of passages down to tier-based ranked passages 436, and then apply one or more additional annotation types in subsequent tiers that each require more processing resources, in order to mitigate the time required for applying annotation types that require more processing resources by applying those annotation types to fewer passages.

Figure 5:
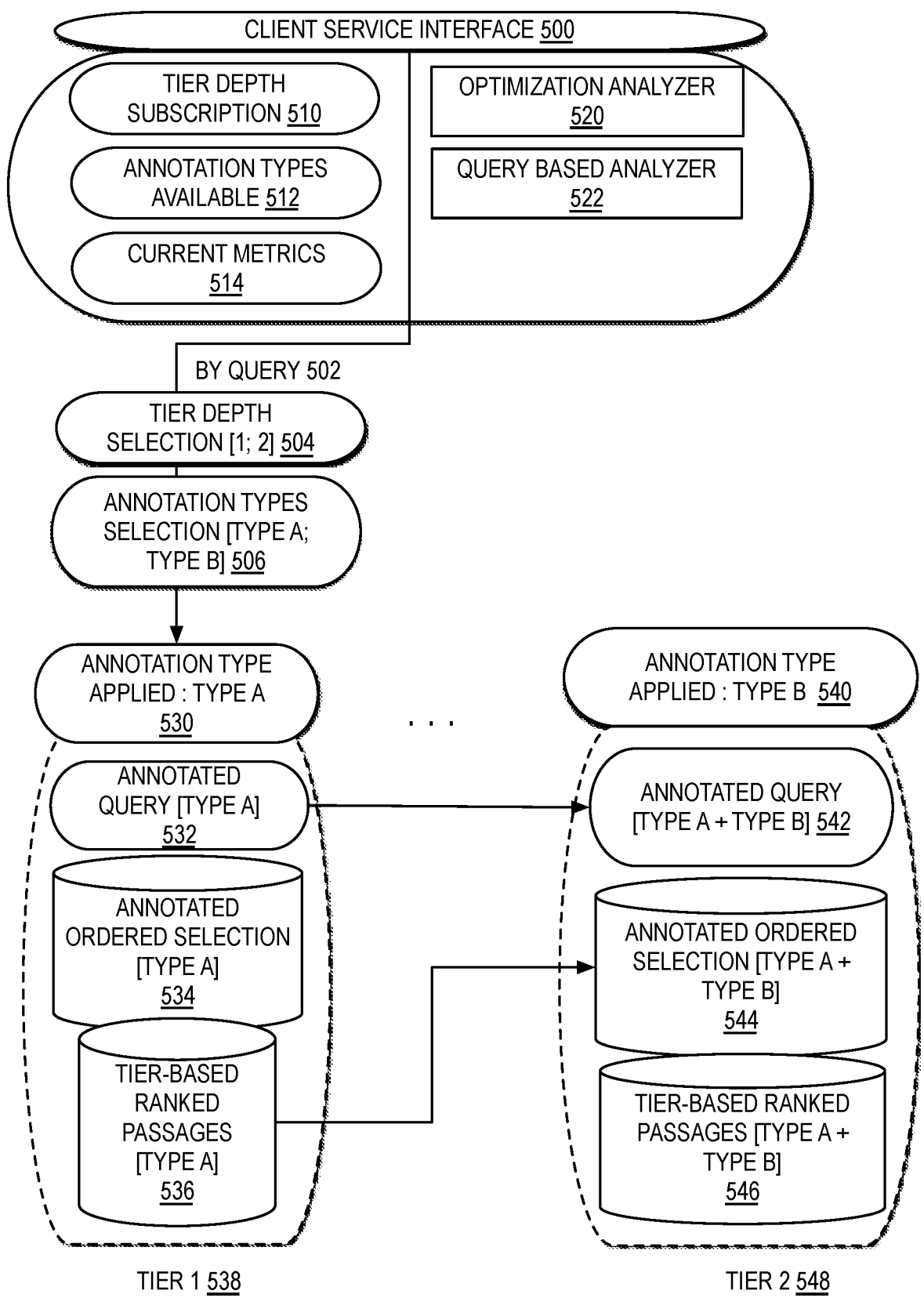
FIG. 5 illustrates one example of a block diagram of multiple tier selections by an NLP search controller of an NLP answering system service specified by client preferences and by query.

FIG. 5 illustrates one example of a block diagram of multiple tier selections by an NLP search controller of an NLP answering system service specified by client preferences and by query.

In one example, a client service interface 500 manages specification of tier services provided by NLP search controller 124, by client preferences and by query, for a natural language question query. In one example, client service interface 500 represents an interface for a cloud-based service selectively subscribed to by one or more clients. In one example, client service interface 500 monitors and evaluates current metrics 514 for the cost, timeliness, and accuracy of service of NLP query searches performed. According to an advantage of the invention, each client may specify one or more parameters related to the cost, timeliness, and accuracy of service provided to users submitting natural language question queries through an interface supported by the client.

In one example, tier depth subscription 510 for a client specifies a number of tiers of annotations requested by a client and may specify preferences for the ordering of annotation types by tier according to cost, processing time, accuracy, and other factors. In addition, for example, annotation types available 512 for a client specifies the selection of annotation types available for application by annotation controller 310 for a particular client.

In one example, a tier depth subscription 510 specifies client preferences for specifying service according to client specified tier depth and annotation type settings for all queries submitted by users managed by client service interface 500 and current performance characteristics. For example, if tier depth subscription 510 specifies a client preference for all queries, then an optimization analyzer 520 evaluates the parameters specified in tier depth subscription 510 and annotation types available 512 according to cost, timeliness, and accuracy of service, and sets the parameters by query 502 of annotation types selection 506 set to a selection of annotation types specified in annotation types available 512, which may also meet any cost, timeliness, and accuracy of service parameters, and sets tier depth selection 504 set to a depth and order, which meet any cost, timeliness, and accuracy of service parameters. For example, a client may specify a preference in tier depth subscription 510 to set a first tier to the annotation type within annotation types available 512 that requires a lowest amount of processing resources for performing each annotation. In another example, a client may specify a preference in tier depth subscription 510 to set a first tier to the annotation type in annotation types available 512 that has a highest degree of accuracy associated. According to an advantage of the invention, by providing a service to clients that selectively determines the annotation types to apply to a query and the ordering of tiering of the annotation types, each client of a service provided by NLP question answering system 120 may select the scope of annotation services provided.

In another example, if tier depth subscription 510 specifies client preferences for further specifying service for specific queries, client service interface 500 manages a query based analyzer 522 that further analyzes each query to determine a number of tiers to apply, the annotation types to apply, and the ordering of annotation types by tier, for a specific query. In one example, query-based analyzer 522 may initially apply the query to one or more types of classifier models for the annotation types included in annotation types available 512 to determine which annotation types occur at a highest frequency within a particular query. In the example, query-based analyzer 522 may evaluate the annotation types that occur most frequently and prioritize the annotation types of a highest frequency in a top tier.

For example, a client may set annotation types available 512 to include annotation types of "type A" and "type B" for queries with a first rating and annotation types of "type A", "type B", and "type C" with a second rating. One client may set annotation types available 512 to include annotation types of "type A" and "type B" for queries and another client may set annotation types available 512 to include annotation types of "type A", "type B", and "type C".

In one example, NLP search controller 124 manages an N-tier depth search selectively set by in by query 502 with tier depth selection 504 of a "tier 1" and a tier 2 and with annotation types selection 506 specified with "type A" associated with "tier 1" and "type B" associated with "tier 2". In the example, for "tier 1", as illustrated at reference numeral 538, annotation controller 310 applies a first annotation type of "type A" to text-type based query 212 to generate annotated query 532 with "type A" annotations and to unstructured ordered selection 236 to generate annotated ordered selection knowledge base 534 with "type A" annotations of the records in unstructured ordered selection 236. In the example, tier-based query controller 320 applies annotated query 532 to annotated ordered selection knowledge base 534 to generate tier-based ranked passages 536, which is a subset of annotated ordered selection knowledge base 534 with a highest probability of matching annotated query 532.

In one example, NLP search controller 124 manages one or more additional tiers, as illustrated at reference numeral 548 as "tier 2". For "tier 2", annotation controller 310 applies a next annotation type of "type B" to annotated query 532 to generate annotated query 542 with "type A" and "type B" annotations and to tier-based ranked passages 536 to generate annotated ordered selection knowledge base 544 with "type A" and "type B" annotations of the records in tier-based ranked passages 536. In the example, tier-based query controller 320 applies annotated query 542 to annotated ordered selection knowledge base 544 to generate tier-based ranked passages 546, which is a subset of annotated ordered selection knowledge base 544 with a highest probability of matching annotated query 542.

In the example, by applying annotation types in tiers and may selectively determining a number of tiers and a selection of annotation types to apply in a tiered hierarchy, NLP search controller 124 may select to apply a first annotation type in a first tier that requires fewer processing resources to narrow the number of passages down to tier-based ranked passages 536, and then apply one or more additional annotation types in subsequent tiers that each require more processing resources, in order to mitigate the time required for applying annotation types that require more processing resources by applying those annotation types to fewer passages.

Figure 6:
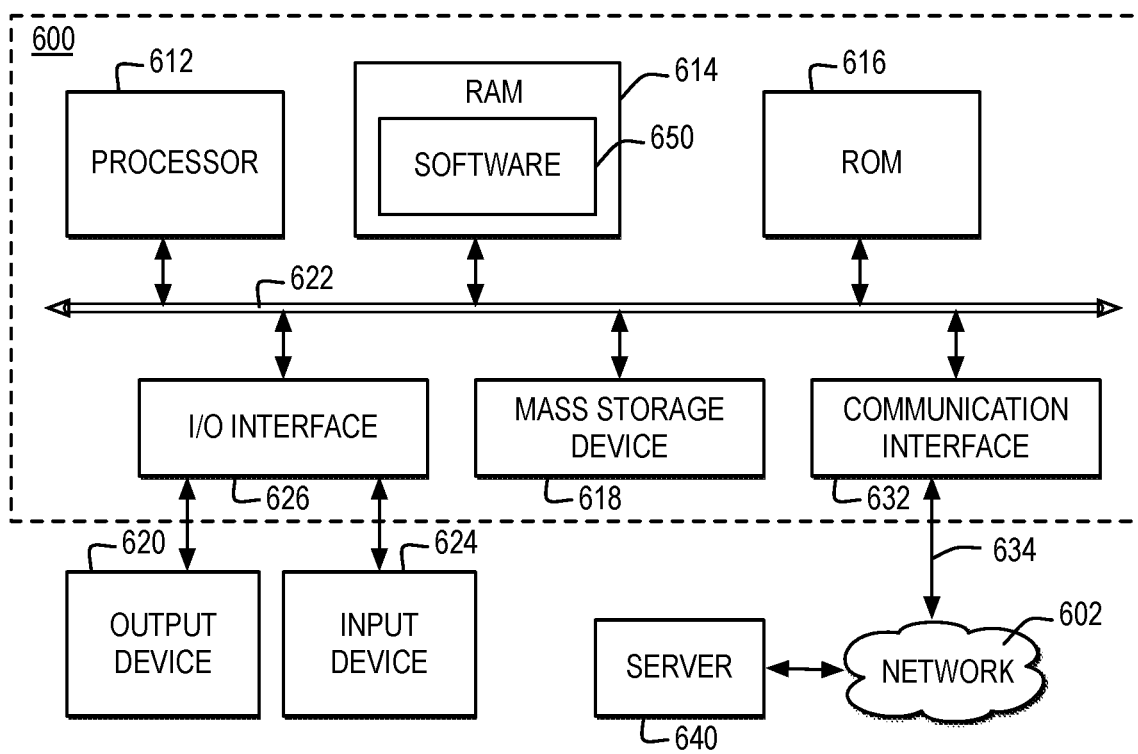
FIG. 6 illustrates one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony-based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

Figure 7:
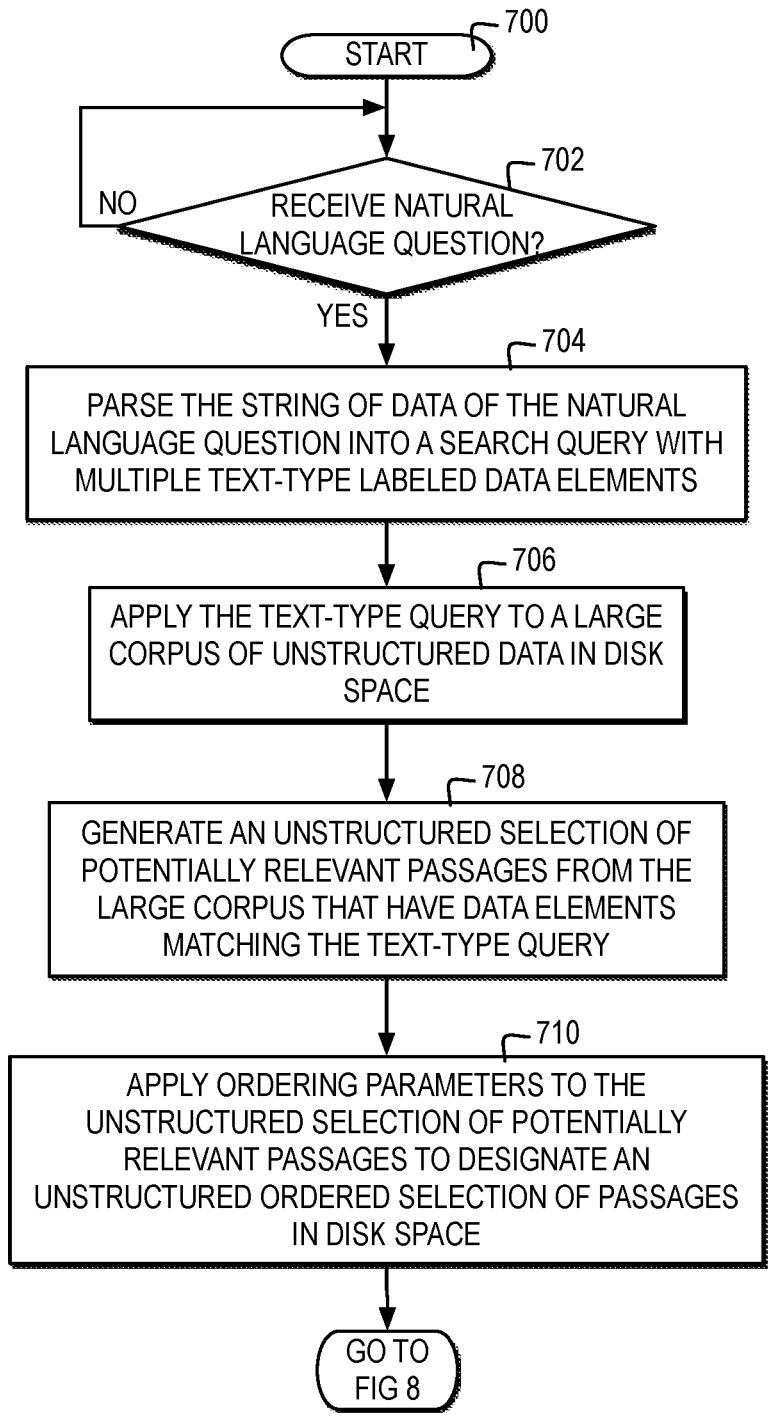
FIG. 7 illustrates a high-level logic flowchart of a process and computer program for efficiently managing a text-type based query of an unstructured corpus.
Figure 8:
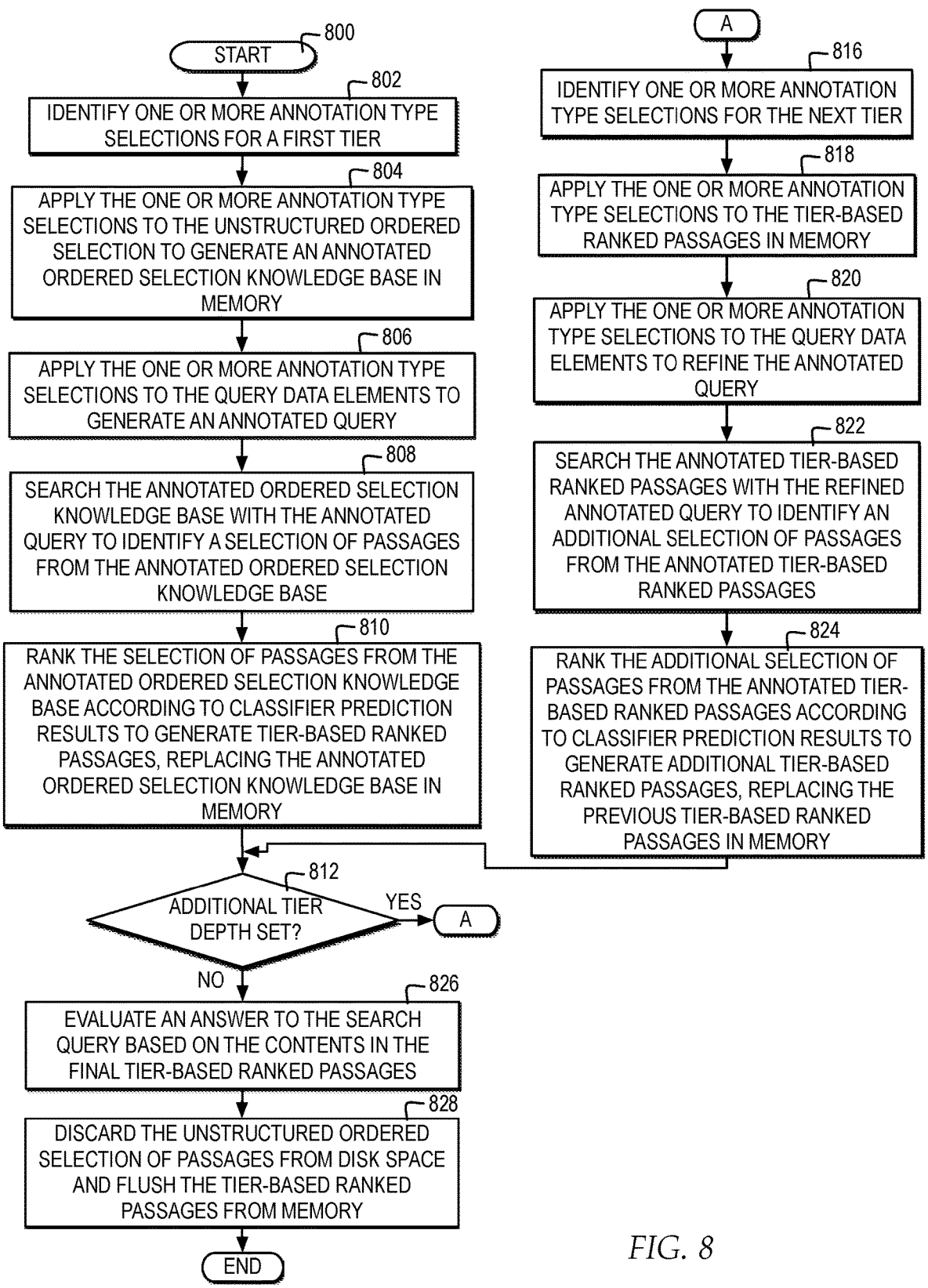
FIG. 8 illustrates a high-level logic flowchart of a process and computer program for managing a tier-based annotated search of an initially filtered unstructured ordered selection of a corpus based on a text-based search.

In one embodiment, the operations performed by processor 612 may control the operations of flowchart of FIGS. 6-8 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 6-8.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely, propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high-level logic flowchart of a process and computer program for efficiently managing a text-type based query of an unstructured corpus.

In one example, the process and computer program product start at block 700 and thereafter proceed to block 702. Block 702 illustrates a determination whether a natural language question is received. At block 702, if a natural language question is received, then the process passes to block 704. Block 704 illustrates parsing the string of data in the natural language question into a search query with multiple text-type labeled data elements. Next, block 706 illustrates applying the text-type query to a large corpus of unstructured data in disk space. Thereafter, block 708 illustrates generating an unstructured selection of potentially relevant passages from the large corpus that have data elements matching the text-type query. Next, block 710 illustrates applying ordering parameters to the unstructured selection of potentially relevant passages to designate an unstructured ordered selection of passages in disk space, and the process passes to block 802 of FIG. 8.

FIG. 8 illustrates a high-level logic flowchart of a process and computer program for managing a tier-based annotated search of an initially filtered unstructured ordered selection of a corpus based on a text-based search.

In the example, a computer process and program start at block 800 and thereafter proceed to block 802. Block 802 illustrates identifying one or more annotation type selections for a first tier. Next, block 804 illustrates applying the one or more annotation type selections to the unstructured ordered selection to generate an annotated ordered selection knowledge base in memory. Thereafter, block 806 illustrates applying the one or more annotation type selections to the query data elements to generate an annotated query. Next, block 808 illustrates searching the annotated ordered selection knowledge base with the annotated query to identify a selection of passages from the annotated ordered selection knowledge base. Thereafter, block 810 illustrates ranking the selection of passages from the annotated ordered selection knowledge base according to classifier prediction results to generate tier-based ranked passages, replacing the annotated ordered selection knowledge base in memory, and the process passes to block 812.

Block 812 illustrates a determination whether an additional tier depth is set. At block 812, if an additional tier depth is not set, then the process passes to block 826. Block 826 illustrates evaluating an answer to the search query based on the contents in the final tier-based ranked passages. Next, block 828 illustrates discarding the unstructured ordered selection of passages from disk space and flushing the tier-based ranked memory passages from memory, and the process ends.

Returning to block 812, if an addition tier depth is not set, then the process passes to block 816. Block 816 illustrates identifying one or more annotation type selections for the next tier. Next, block 818 illustrates applying the one or more annotation type selections to the tier-based ranked passages in memory. Thereafter, block 820 illustrates applying the one or more annotation type selections to the query data elements to refine the annotated query. Next, block 822 illustrates searching the annotated tier-based ranked passages with the refined annotated query to identify an additional selection of passages from the annotated tier-based ranked passages. Thereafter, block 824 illustrates ranking the additional selection of passages from the annotated tier-based ranked passages according to classifier prediction results to generate additional tier-based ranked passages, replacing the previous tier-based ranked passages in memory, and the process passes to block 812.

Figure 9:
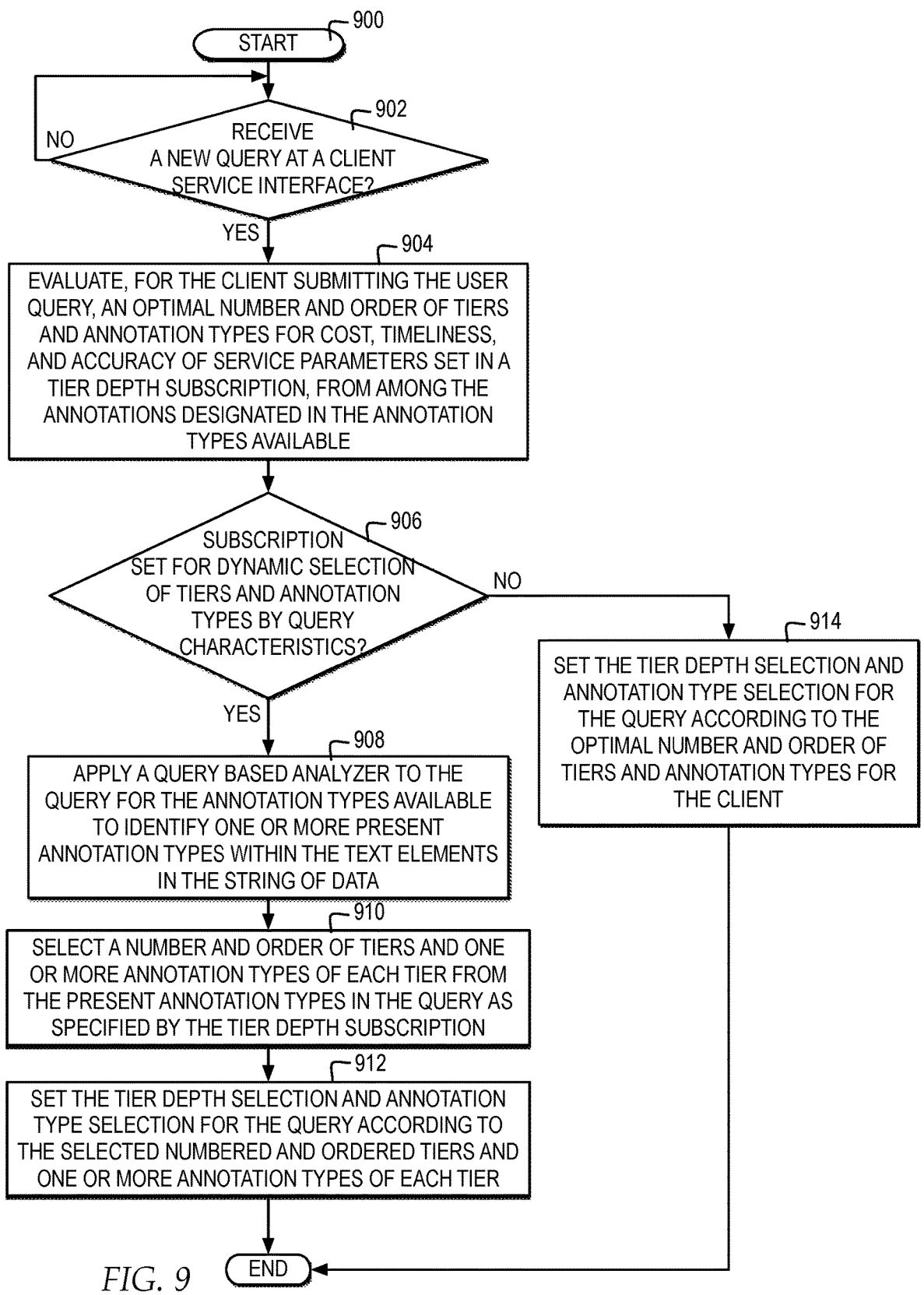
FIG. 9 illustrates a high-level logic flowchart of a process and computer program for selection of tier depth selection and annotation types for a tier-based annotated search of an initially filtered unstructured ordered selection of a corpus based on a text-based search.

FIG. 9 illustrates a high-level logic flowchart of a process and computer program for selection of tier depth selection and annotation types for a tier-based annotated search of an initially filtered unstructured ordered selection of a corpus based on a text-based search.

In one example, the computer program and process starts at block 900 and thereafter proceeds to block 902. Block 902 illustrates a determination whether a new query is received at a client service interface. At block 902, if a new query is received at a client service interface, then the process passes to block 904. Block 904 illustrates evaluating, for the client submitting the user query, an optimal number and order of tiers and annotation types for cost, timeliness, and accuracy of service parameters set in a tier depth subscription, from among the annotations designated in the annotation types available, and the process passes to block 906.

Block 906 illustrates a determination of whether a subscription is set for dynamic selection of tiers by query characteristics. At block 906, if the subscription is not set for dynamic selection of tiers by query characteristics, then the process passes to block 914. Block 914 illustrates setting the tier depth selection and annotation type selection for the query according to the optimal number and order of tiers and annotation types for the client, and the process ends.

At block 906, if the subscription is set for dynamic selection of tiers by query characteristics, then the process passes to block 908. Block 908 illustrating applying a query-based analyzer to the query for the annotation types available to identify one or more present annotation types within the text elements in the string of data. Next, block 910 illustrates selecting a number and order of tiers and one or more annotation types of each tier from the present annotation types in the query as specified by the tier depth subscription. Thereafter, block 912 illustrates setting the tier depth selection and annotation type selection for the query according to the selected numbered and ordered tiers and one or more annotation types of each tier, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   converting, by a computing device, a question received in a natural language format into a string of a plurality of text elements;
   searching, by the computing device, a corpus comprising a plurality of unstructured passages with the string of the plurality of text elements as search terms to identify a selection of unstructured passages from the corpus relevant to the plurality of text elements;
   annotating, by the computing device, the selection of relevant unstructured passages with one or more annotations according to at least one natural language annotation type to generate an annotated selection knowledge base;
   modifying, by the computing device, the string of the plurality of text elements by annotating at least one text element within the plurality of text elements according to the at least one natural language annotation type;
   searching, by the computing device, the annotated selection knowledge base using the modified string of the plurality of text elements to generate a selection of ranked passages; and
   identifying, by the computing device, an answer to the question based on the selection of ranked passages.

2. The method according to claim 1, wherein searching, by the computing device, a corpus comprising a plurality of unstructured passages with the string of the plurality of text elements as search terms to identify a selection of unstructured passages from the corpus relevant to the plurality of text elements further comprises:
   ordering, by the computing device, the selection of unstructured passages from most relevant to least relevant according to a frequency of matching elements with the selection of unstructured passages within the plurality of text elements; and
   selecting, by the computing device, a subset of unstructured passages, ordered starting from most relevant, as the selection of unstructured passages.

3. The method according to claim 1, further comprising:
   responsive to generating the selection of ranked passages, determining, by the computing device, whether an additional tier depth is set;
   responsive to determining an additional tier depth is set, identifying, by the computing device, at least one additional natural language annotation type, wherein the at least one additional natural language annotation type is different from the at least one natural language annotation type;
   annotating, by the computing device, the selection of ranked passages with one or more additional annotations according to the at least one additional natural language annotation type to generate an additional annotated selection knowledge base;
   modifying, by the computing device, the string of the plurality of text elements by annotating at least one text element within the plurality of text elements according to the at least one additional natural language annotation type;
   searching, by the computing device, the additional annotated selection knowledge base using the modified string of the plurality of text elements to generate an additional selection of ranked passages; and
   identifying, by the computing device, the answer to the question based on the additional selection of ranked passages.

4. The method according to claim 1, further comprising:
   storing, by the computing device, the corpus and the selection of relevant unstructured passages in disk space; and
   storing, by the computing device, the annotated ordered selection knowledge base and selection of ranked passages in memory space, wherein the memory space is closer in proximity to one or more processors than the disk space, wherein a number of passages in annotated ordered selection knowledge base and selection of ranked passages is set to a limit to fit within memory space.

5. The method according to claim 4, further comprising:
   replacing, by the computing device, the selection of relevant unstructured passages in memory with the selection of ranked passages; and
   responsive to identifying the answer to the question based on the selection of ranked passages, discarding, by the computing device, the selection of relevant unstructured passages from disk space and flushing the selection of ranked passages from the memory space.

6. The method according to claim 1, wherein annotating, by the computing device, the selection of relevant unstructured passages with one or more annotations according to at least one natural language annotation type to generate an annotated selection knowledge base further comprises:
   annotating, by the computing device, the selection of relevant unstructured passages with the one or more annotations according to the at least one natural language annotation type comprising a syntactic annotation.

7. The method according to claim 1, wherein annotating, by the computing device, the selection of relevant unstructured passages with one or more annotations according to at least one natural language annotation type to generate an annotated selection knowledge base further comprises:
   annotating, by the computing device, the selection of relevant unstructured passages with the one or more annotations according to the at least one natural language annotation type comprising a named entity annotation.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to convert a question received in a natural language format into a string of a plurality of text elements;

program instructions to search a corpus comprising a plurality of unstructured passages with the string of the plurality of text elements as search terms to identify a selection of unstructured passages from the corpus relevant to the plurality of text elements;

program instructions to annotate the selection of relevant unstructured passages with one or more annotations according to at least one natural language annotation type to generate an annotated selection knowledge base;

program instructions to modify the string of the plurality of text elements by annotating at least one text element within the plurality of text elements according to the at least one natural language annotation type;

program instructions to search the annotated selection knowledge base using the modified string of the plurality of text elements to generate a selection of ranked passages; and program instructions to identify an answer to the question based on the selection of ranked passages.

9. The computer system according to claim 8, the program instructions further comprising:

program instructions to order the selection of unstructured passages from most relevant to least relevant according to a frequency of matching elements with the selection of unstructured passages within the plurality of text elements; and program instructions to select a subset of unstructured passages, ordered starting from most relevant, as the selection of unstructured passages.

10. The computer system according to claim 8, the program instructions further comprising:

program instructions to, responsive to generating the selection of ranked passages, determine whether an additional tier depth is set;

program instructions to, responsive to determining an additional tier depth is set, identifying at least one additional natural language annotation type, wherein the at least one additional natural language annotation type is different from the at least one natural language annotation type;

program instructions to annotate the selection of ranked passages with one or more additional annotations according to the at least one additional natural language annotation type to generate an additional annotated selection knowledge base;

program instructions to modify the string of the plurality of text elements by annotating at least one text element within the plurality of text elements according to the at least one additional natural language annotation type;

program instructions to search the additional annotated selection knowledge base using the modified string of the plurality of text elements to generate an additional selection of ranked passages; and program instructions to identify the answer to the question based on the additional selection of ranked passages.

11. The computer system according to claim 8, the program instructions further comprising:

program instructions to store the corpus and the selection of relevant unstructured passages in disk space; and program instructions to store the annotated ordered selection knowledge base and selection of ranked passages in memory space, wherein the memory space is closer in proximity to one or more processors than the disk space, wherein a number of passages in annotated ordered selection knowledge base and selection of ranked passages is set to a limit to fit within memory space.

12. The computer system according to claim 11, the program instructions further comprising:

program instructions to replace the selection of relevant unstructured passages in memory with the selection of ranked passages; and program instructions to, responsive to identifying the answer to the question based on the selection of ranked passages, discard the selection of relevant unstructured passages from disk space and flushing the selection of ranked passages from the memory space.

13. The computer system according to claim 8, the program instructions further comprising:

program instructions to annotate the selection of relevant unstructured passages with the one or more annotations according to the at least one natural language annotation type comprising a syntactic annotation.

14. The computer system according to claim 8, the program instructions further comprising:

program instructions to annotate the selection of relevant unstructured passages with the one or more annotations according to the at least one natural language annotation type comprising a named entity annotation.

15. A computer program product comprises a computer readable storage medium having program instructions embodied therewith, wherein the computer readable storage medium is not a transitory signal per se, the program instructions executable by a computer to cause the computer to:

convert, by a computer, a question received in a natural language format into a string of a plurality of text elements;

search, by the computer, a corpus comprising a plurality of unstructured passages with the string of the plurality of text elements as search terms to identify a selection of unstructured passages from the corpus relevant to the plurality of text elements;

annotate, by the computer, the selection of relevant unstructured passages with one or more annotations according to at least one natural language annotation type to generate an annotated selection knowledge base;

modify, by the computer, the string of the plurality of text elements by annotating at least one text element within the plurality of text elements according to the at least one natural language annotation type;

search, by the computer, the annotated selection knowledge base using the modified string of the plurality of text elements to generate a selection of ranked passages; and identify, by the computer, an answer to the question based on the selection of ranked passages.

16. The computer program product according to claim 15, further comprising the program instructions executable by a computer to cause the computer to:

order, by the computer, the selection of unstructured passages from most relevant to least relevant according to a frequency of matching elements with the selection of unstructured passages within the plurality of text elements; and select, by the computer, a subset of unstructured passages, ordered starting from most relevant, as the selection of unstructured passages.

17. The computer program product according to claim 15, further comprising the program instructions executable by a computer to cause the computer to:
responsive to generating the selection of ranked passages, determine, by the computer, whether an additional tier depth is set;
responsive to determining an additional tier depth is set, identify, by the computer, at least one additional natural language annotation type, wherein the at least one additional natural language annotation type is different from the at least one natural language annotation type;
annotate, by the computer, the selection of ranked passages with one or more additional annotations according to the at least one additional natural language annotation type to generate an additional annotated selection knowledge base;
modify, by the computer, the string of the plurality of text elements by annotating at least one text element within the plurality of text elements according to the at least one additional natural language annotation type;
search, by the computer, the additional annotated selection knowledge base using the modified string of the plurality of text elements to generate an additional selection of ranked passages; and
identify, by the computer, the answer to the question based on the additional selection of ranked passages.

18. The computer program product according to claim 15, further comprising the program instructions executable by a computer to cause the computer to:
store, by the computer, the corpus and the selection of relevant unstructured passages in disk space; and
store, by the computer, the annotated ordered selection knowledge base and selection of ranked passages in memory space, wherein the memory space is closer in proximity to one or more processors than the disk space, wherein a number of passages in annotated ordered selection knowledge base and selection of ranked passages is set to a limit to fit within memory space.

19. The computer program product according to claim 18, further comprising the program instructions executable by a computer to cause the computer to:
replace, by the computer, the selection of relevant unstructured passages in memory with the selection of ranked passages; and
responsive to identifying the answer to the question based on the selection of ranked passages, discard, by the computer, the selection of relevant unstructured passages from disk space and flushing the selection of ranked passages from the memory space.

20. The computer program product according to claim 15, further comprising the program instructions executable by a computer to cause the computer to:
annotate, by the computer, the selection of relevant unstructured passages with the one or more annotations according to the at least one natural language annotation type comprising a syntactic annotation.

* * * * *